Feb. 18, 1941.     R. J. KENT     2,231,919
GRAPPLING DEVICE
Filed Nov. 3, 1939     2 Sheets-Sheet 1
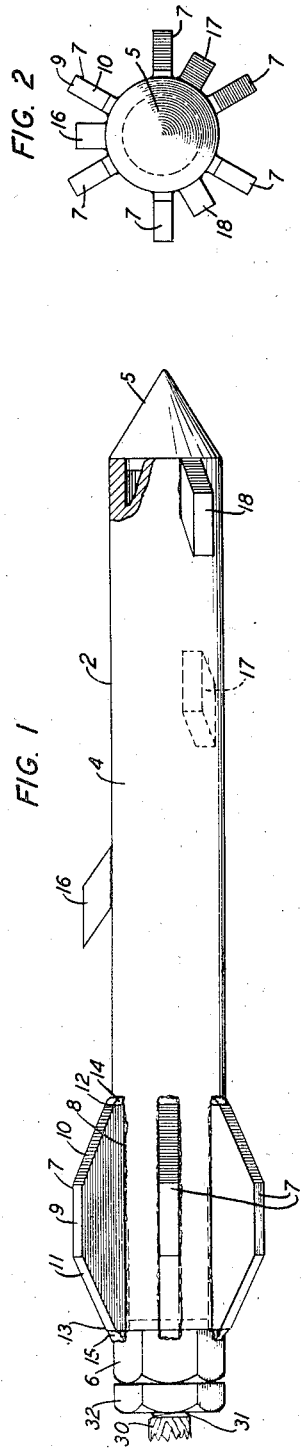
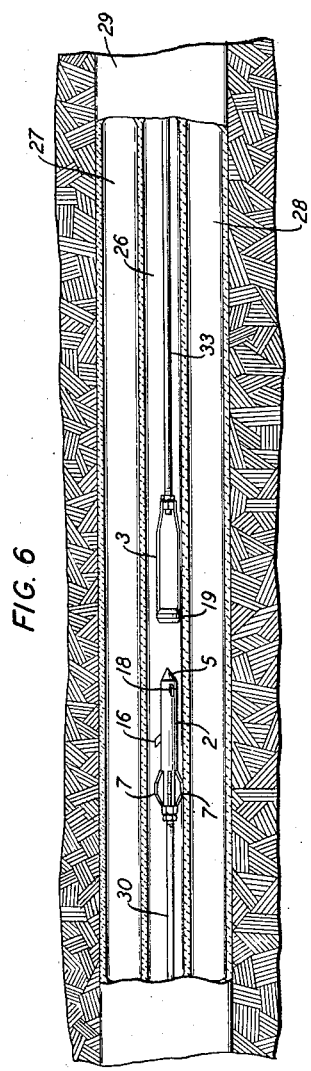
INVENTOR
R. J. KENT
BY J. MacDonald
ATTORNEY Feb. 18, 1941.   R. J. KENT   2,231,919
GRAPPLING DEVICE
Filed Nov. 3, 1939   2 Sheets-Sheet 2
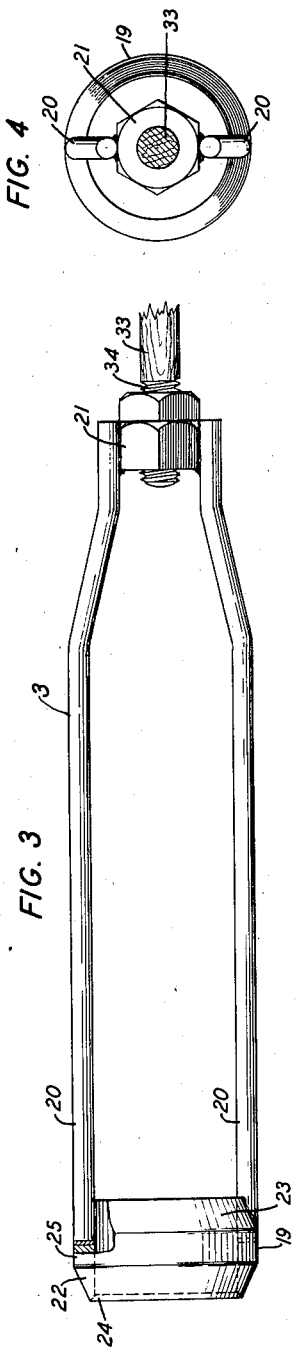
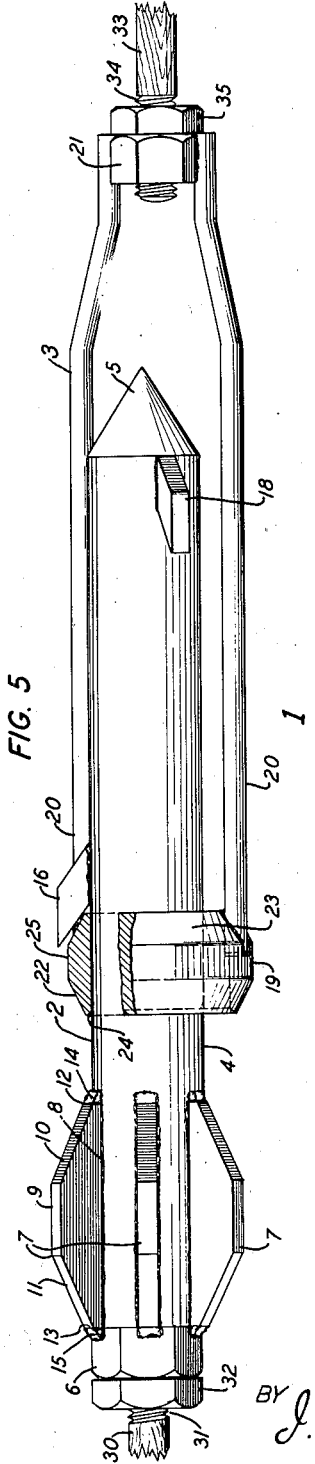
INVENTOR
R. J. KENT
BY J. MacDonald
ATTORNEY Patented Feb. 18, 1941

2,231,919

UNITED STATES PATENT OFFICE 2,231,919

GRAPPLING DEVICE

Robert J. Kent, Jamaica, N. Y., assignor to Bell Telephone Laboratories, Incorporated, New York, N. Y., a corporation of New York Application November 3, 1939, Serial No. 302,636

4 Claims. (Cl. 287—103)

This invention relates to grappling devices and more particularly to devices of the type above-mentioned suitable for use in ducts. The device may be used in connection with the running of rods through a duct preliminary to the running of a wire line through the duct.

The object of the invention is to provide improved means for getting rods through a duct.

The device comprises two separate parts which may be thrust into a duct from opposite ends of the duct and then coupled together within the duct, one of the parts being a pilot member and the other a receiver member for the pilot member.

A feature of the invention resides in the pilot member.

Another feature resides in the receiver member.

Other features reside in the parts in combination.

In the drawings:

Fig. 1 is a side view, partly in section, of the pilot member;

Fig. 2 is an end view of the pilot member taken from the right of Fig. 1;

Fig. 3 is a side view, partly in section, of the receiver member;

Fig. 4 is an end view of the receiver member taken from the right of Fig. 3;

Fig. 5 is a side view, partly in section, of the pilot and receiver members coupled together in one of the plurality of coupling positions; and, Fig. 6 is a side view, partly in section, of a portion of a multiple duct system and showing the pilot and receiver members in one of the ducts, the pilot and receiver members being in positions from which they may be thrust into engagement with each other. Fig. 6 is drawn on a reduced scale relative to the other figures.

In the running of cables of an electrical system through ducts, it is common practice for the cabling crew to first run a rod through a required duct and use the rod as a means for getting a cable through the duct or as a means for getting a winch rope through the duct, the winch rope being used in turn for pulling the cable through the duct. The duct may be relatively long and extend from one street manhole to another or may be a relatively long duct provided in the wall structure of a building. It will be assumed merely for the purpose of illustrating the invention that the duct is buried in the ground and that it extends from one street manhole to another. The rod to be run through the duct may comprise a plurality of rod sections equipped with suitable couplings so that a relatively long rod may be made by coupling a plurality of sections together in end to end relation. To get the rod through the duct it is sometimes found necessary or advisable to thrust a rod part way through the duct from one manhole and to thrust another rod through the duct from another manhole, the rods being made to travel toward each other. In order that the rods thrust into the duct from the two ends of the duct may be both withdrawn from the same end of the duct and thus utilized as a means for getting a cable line or a winch rope for the cable line through the duct, it is necessary that the two rods be at least temporarily coupled together while they are within the duct.

My invention is a grappling device for temporarily coupling the two rods together while the rods are in the duct.

The grappling device 1, as shown in Fig. 5, is made in two main parts, namely, a pilot member 2, shown in Fig. 1, and a receiver member 3 shown in Fig. 3.

The pilot member 2 comprises a cylindrical rod 4, having a conical front edge portion 5, and an internally threaded rear end portion 6, the end portion 6 being somewhat larger in diameter than the diameter of the rod 4 and being adapted for engagement by a wrench (not shown). A series of spaced fins 7 are provided on the rod 4 immediately forward of the rear end portion 6. Each fin 7 has a long base portion 8, a shorter top portion 9 and downwardly sloping portions 10 and 11, the portions 10 and 11 being in the nature of inclined planes running downward from the top portion 9 to the respective front and rear end portions 12 and 13 of the fin 7. The base portion 8 is secured to the outer surface of the rod 4 and extends lengthwise of the rod 4 but is much shorter than the rod 4. A convenient way of securing the fin 7 to the rod 4 is to weld the front end 12 at 14 to the outer surface of the rod 4 and to weld the rear end 13 at 15 to the outer surface of the rear end portion 6, the welds formed at these points being in effect continuations of the sloping portions of the fin 7. Spaced along the unfinned portion of the rod 4 and toward the conical front end portion 5, are barbs 16, 17 and 18. The barbs 16, 17 and 18 extend radially of the rod 4 and are arranged in a helical path, so that each barb extends in a different radial direction from the others. Each barb is a diamond shaped block and is fixed at one of its straight edge portions to the outer surface of the rod 4 and so that one of its sharp pointed ends is spaced from the rod 4 and is directed toward the rear end portion of the rod, and the other sharp pointed end is in engagement with the rod and is directed toward the front conical end portion 5 of the rod 4. The barb 18 is located adjacent the wider end of the conical end portion 5 of the rod 4. The barb 17 is located rearwardly and offset from the position occupied by the barb 18 and the barb 16 is located rearwardly and offset from the position of the barb 17. The rod 4 may be a metal cylinder and the barbs 16, 17 and 18 may be metal blocks of the required form welded along one of their straight edge portions to the outer surface of the rod 4. I have shown three barbs on the pilot member. It is to be understood, however, that a different number of barbs may be provided in the structure without departing from the spirit of the invention. To lighten the structure the rod 4 may comprise a cylindrical tube secured to one end of which is the conical front end portion 5 as shown in Fig. 1. The fins 7 should project a greater distance from the bar 4 than the barbs 16, 17 and 18, the reason for which will be subsequently explained.

The receiver member 3 is adapted to receive the pilot member 2 and comprises a ring 19, a plurality of spaced bars 20 and an internally threaded end portion 21. The ring 19 is of sufficient internal diameter to readily receive the rod 4 of the pilot member 2 and any one of the barbs on the rod 4 but is not large enough in diameter to receive the rod 4 and the barbs, if any two of the barbs were located directly opposite each other on the rod 4. In other words, the overall diameter of the rod 4 inclusive of the barbs 16, 17 and 18 is slightly greater than the internal diameter of the ring 19. Since the barbs 16, 17 and 18 are located in spaced relation and in a helical path along the rod 4, the rod 4 may be thrust through the ring 19 by applying a slight rocking or oscillating movement to the rod 4 while it is being thrust through the ring 19. The two ends of the ring 19 are beveled on the outer surface to provide the beveled edge portions 22 and 23, the edge portion 23 sloping toward the end portion 21 of the receiver 3 and the edge portion 22 sloping in the opposite direction. The outer end portion of the ring 19 is internally beveled at 24 to facilitate thrusting of the pilot member 2 within the receiver member 3. The outer central portion 25 of the ring 19 is made cylindrical to facilitate sliding of the receiver member 3 in a duct as shown in Fig. 6. The bars 20—20 are secured at one end to the cylindrical portion 25 of the ring 19 and are located at diametrically opposite points on the ring 19. The other ends of the bars 20—20 are secured to the outer surface of the internally threaded end portion 21 which may be, for instance, a hexagon nut. The end portion 21 is of smaller outside diameter than the outside diameter of the ring 19. The bars 20—20 extend for the greater portion of their length in parallel spaced relation and then converge toward the end portion 21. The end portions of the bars 20—20 are then bent to extend in parallel spaced relation to the points at which the bars 20—20 are secured to end portion 21. The receiver member 3 is made long enough to receive all of the barbed portion of the pilot member 2. The two parts of the grappling device 1, namely, the pilot member 2 and the receiver member 3 are adapted to be supported on rods to be thrust within a duct 26 as shown in Fig. 6. The duct 26 may be a single duct located in a building structure or in the ground or may be one of a plurality of similar ducts 27 and 28 in a pipe 29.

When a cabling crew wants to get a rod through the duct 26, a rod 30 having a male-threaded end portion 31, shown in Figs. 1 and 5, is secured in the rear end portion 6 of the pilot member 2. A lock-nut 32 may be provided on the male-threaded end portion 31 of the rod 30 to prevent undesired separation of the rod 30 from the pilot member 2. The pilot member 2 is thrust into the duct 26 from one end of the duct and is then thrust along within the duct 26 by means of the rod 30 toward the other end of the duct. A rod 33 having a male-threaded end 34 is secured in the end portion 21 of the receiver member 3. A lock-nut 35 may be provided on the male-threaded end portion 34 of the rod 33 to prevent undesired separation of the rod 33 from the receiver member 3. The receiver member 3 is thrust into the duct 26 from an end of the duct 26 opposite to that in which the pilot member 2 is thrust. The receiver member 3 is then thrust along within the duct 26 by means of the rod 33. The pilot member 2 and the receiver member 3 are pushed toward each other by means of the respective rods 30 and 33 until the rod 4 of the pilot member 2 is thrust a sufficient distance within the receiver member 3 to get one or more of the barbs 16, 17, 18 entirely through the ring 19. The most desirable condition is to have the pilot member 2 thrust sufficiently far into the receiver member 3 so that all of the barbs 16, 17 and 18 are passed through the ring 19 as shown in Fig. 5. This condition can be quite well ascertained by thrusting on the rods 30 and 33 until further thrusting movements are prevented by the fins 7 on the pilot member 2 coming into contact with the ring 19 of the receiver member 3. When this condition is attained a backward pull on the rod 30 will bring one of the barbs 16, 17 and 18 into engagement with the inner end of the ring 19. Since each barb on the pilot member 2 has a pointed end spaced from the outer surface of the rod 4 of the pilot member and this pointed end is directed toward the rear of the pilot member 2, the rearwardly pointed end of the barb will engage the outer surface of the beveled edge 23 of the ring 19 as shown for instance in Fig. 5 and prevent longitudinal separation of the pilot member 2 and the receiver member 3. In this case the barb 16 is shown as engaging the ring 19. It will be seen that if a backward pull is applied to the rod 30, the receiver member 3 and the rod 33 attached thereto will be pulled along through the duct and that the rod 33 will be eventually pulled to the end of the duct 26 from which the pulling action is applied. By having a plurality of barbs arranged on the pilot member 2 as above described, I minimize the possibility of the pilot member 2 being withdrawn from the receiver member 3 when a backward pull is applied to the rod 30. The rod might in some cases be so manipulated that the barb 16 will not engage the beveled edge of the ring 19, but will pass through the ring 19 when a backward pull is applied to the rod 30. In this event, however, further pulling on the rod 30 will bring either the barb 17 or the barb 18 into engagement with the beveled edge 23 of the ring 19 since these barbs extend from the rod 4 of the pilot member 2 at different positions from that of the barb 16.

When a rod has been made to extend all the way through the duct 26, the rod 33 may be used as a means for getting a conductor cable through the duct or as a means for getting the winch rope through the duct, the conductor cable or the winch rope being secured to one end of the rod 33 and the rod 33 being pulled through the duct until the conductor cable or winch rope extends all the way through the duct. If the rod 33 is used as a means for getting a winch rope through the duct, the winch rope is used in turn to get a conductor cable through the duct, the conductor cable being suitably fastened to one end of the winch rope and the rope being pulled through the duct until the conductor cable extends all the way through the duct.

It will be seen by looking at Fig. 6 that the pilot member 2 and the receiver member 3 are made in such dimensions that they will readily pass through the duct 26 but that they cannot pass entirely by each other in the duct 26. The fins 7 on the pilot member 2 form bearing surfaces for the pilot member 2 against the wall surfaces of the duct 26 and facilitate directing of the conical forward end portion 5 of the pilot member 2 into the ring 19 of the receiver member 3. When the backwardly sloping forward end portion of each barb comes into engagement with the ring 19 and a forward thrust is applied to the pilot member 2, the pilot member 2 is laterally moved by reason of the barbs frictional engagement with the ring 19 to a sufficient extent to get the barb through the ring 19. The pilot member 2 is therefore oscillated as it is thrust into the receiver member 3. Due to the form and arrangement of the barbs 16, 17 and 18 on the pilot member 2, however, a straight backward pull applied to the pilot member 2 will result in the ring 19 on the receiver member 3 being engaged by one of the barbs on the pilot member 2. Release of the receiver member 3 from the pilot member 2 can only be accomplished by applying a considerable tilting or oscillating movement to either the pilot member 2 or the receiver member 3 relative to the other part while an attempt is being made to pull them apart. The fins 7 extend radially from the bar 4 a greater distance than the barbs 16, 17 and 18 to provide for sufficient elevation of the barbed portion of the pilot member 2 from the lower surface of the duct 26 for the pilot member 2 to be directed into the ring 19 of the receiver member 3. The fins 7 are also made of such dimension that the finned portion of the pilot member 2 cannot be thrust entirely through the receiver member 3.

What is claimed is:

1. A grapple comprising a pilot member and a receiver member adapted to internally receive said pilot member, a set of radially and rearwardly extending spaced barbs supported in helical relation along a portion of said pilot member and a ring in said receiver member for selective engagement by said barbs.

2. In a grapple comprising a pilot member and a receiver member adapted to internally receive said pilot member, a set of radially and rearwardly extending barbs distributed in a helical path along a portion of said pilot member and a ring in said receiver member of sufficiently large internal dimension to permit said pilot member to be oscillatingly thrust therethrough but too small to permit straight withdrawal of said pilot member from said receiver member.

3. A grappling device comprising a pilot member equipped with a plurality of diamond shaped barbs spaced helically along its forward portion and pointing toward the rear of said pilot member and a receiver member for said pilot member having a bevel edged ring adapted to be engaged by any one of said barbs to hold said pilot and receiver members together.

4. A grappling device comprising a pilot member having a pointed front end portion, a female-threaded rear end portion, a bar portion equipped with diamond shaped barbs spaced helically along the bar portion and pointing toward the rear end portion of said pilot member, a plurality of annularly spaced fins located immediately forward of the rear end portion of said pilot member and extending radially of said bar portion a greater distance than said barbs, a receiver member for said pilot member comprising a bevel edged ring adapted to be selectively engaged by said barbs, a plurality of spaced rods attached to said ring and extending longitudinally of said ring and a female-threaded end portion on said receiver member located rearwardly of and spaced from said ring.

ROBERT J. KENT.